United States Patent
Morein

(10) Patent No.: US 6,999,076 B2
(45) Date of Patent: Feb. 14, 2006

(54) SYSTEM, METHOD, AND APPARATUS FOR EARLY CULLING

(75) Inventor: Stephen L. Morein, Cambridge, MA (US)

(73) Assignee: ATI Technologies, Inc., Thornhill (CA)

( * ) Notice: Subject to any disclaimer, the term of this patent is extended or adjusted under 35 U.S.C. 154(b) by 339 days.

(21) Appl. No.: 10/076,350

(22) Filed: Feb. 19, 2002

(65) Prior Publication Data

US 2003/0080959 A1 May 1, 2003

Related U.S. Application Data

(60) Provisional application No. 60/330,676, filed on Oct. 29, 2001.

(51) Int. Cl.
G06T 15/40 (2006.01)

(52) U.S. Cl. .................. 345/422; 345/557; 345/560; 345/545; 345/589; 345/582; 345/421

(58) Field of Classification Search ............. 345/421, 345/422, 441, 581, 582, 611, 589, 545, 560, 345/557, 419
See application file for complete search history.

(56) References Cited

U.S. PATENT DOCUMENTS

| | | | |
|---|---|---|---|
| 6,421,764 B1 | 7/2002 | Morein | |
| 6,476,807 B1 * | 11/2002 | Duluk et al. | 345/421 |
| 6,480,205 B1 | 11/2002 | Greene et al. | |
| 6,492,987 B1 | 12/2002 | Morein | |
| 6,636,215 B1 | 10/2003 | Greene | |
| 6,717,576 B1 * | 4/2004 | Duluk et al. | 345/419 |

OTHER PUBLICATIONS

Segal et al, "The Design Of The OpenGL Graphics Interface," Silicon Graphics, Inc. © 1994, pp. 1–10.
Zyda, CS–4470 Image Synthesis, Part 3, Blending, Jun. 23, 1996, 10 pages.
Baker, "Alpha–blending and the Z–buffer" 4 pages, http://sjbaker.org/steve/omniv/alpha_sorting.html.
Coorg et al, "Real–Time Occlusion Culling for Models with Large Occluders," In Proc. 1997, ACM Symposium on Interactive 3D graphics, pp. 83–90 and 189.
Bartz et al, "Extending Graphics Hardware for Occlusion Queries in OpenGL," Computer Graphics Lab, University of Tubingen, pp. 97–104.
Jouppi, "Improving Direct–Mapped Cache Performance by the Addition of a Small Fully–Associative Cache and Prefetch Buffers," WRL, Technical Note TN–14, Western Research Laboratory, Palo Alto, CA, Mar. 1990, pp 1–36, (∓ covers and pp. i–vii).

(Continued)

Primary Examiner—Kimbinh T. Nguyen
(74) Attorney, Agent, or Firm—Hartman Patents PLLC

(57) ABSTRACT

A method of graphics processing includes determining a non-depth conditional status and an occlusion status of a fragment. Such a method may be used in culling occluded fragments before expending resources such as processing cycles and memory bus usage. In one example, a scratchpad stores depth values of robust fragments and is used for occlusion testing. Graphics architectures, and methods that include use of representative Z values, are also disclosed.

44 Claims, 13 Drawing Sheets

OTHER PUBLICATIONS

Greene et al., Apple Computer, U.C. Santa Cruz, "Hierarchical Z–Buffer Visibility," reprint, 7 pages.

Greene et al., Apple Computer (greene@apple.com), "Hierarchical Polygon Tiling With Coverage Masks," Reprint, (12 pages).

Occlusion Culling, Delphi3D—Rapid OpenGL Development, 3 pages, http://www.gamedeveloper.org/delphi3d/3de/3de_22.shtml.

"Occlusion Culling Algorithms," Gamasutra—Features [11.09.99], 5 pages, http://www.gamasutra.com/features/19991109/moller_haines_03.htm.

Alpha Blending, Dec. 6, 2000, 8 pages, http://mecadserv1.technion.ac.il/public_html/Courses/interActiveGraphics/ogl_course/ogl lab/o.

Wittenbrink et al., "Opacity–Weighted Color Interpolation for Volume Sampling," Computer Systems Laboratory, HPL–97–31 (R.2) Jul., 1998 © Hewlett–Packard Company 1998, (10 pages: cover pp. 1–9).

Greene, Ned Greene Consulting (ned@ngreene.com), "Occlusion Culling with Optimized Hierarchical Buffering," (1 page).

"Straight from ATI," Firing Squad, 2 pages, http://firingsquad.gamers.com/hardware/radeonpreview/page 3.asp.

"B–Radeon's HyperZ," Tom's Hardware Guide: Graphics Guide—Ati's New Radeon–Smart Technology Meets Bru, 1 page, http://www.tomshardware.com/graphic/00q3/000717/radeon256–10.html.

"Fast Z–Clear," Toms Hardware Guide—ATi's New Radeon–Smart Technology Meets Bru, 1 page, http://www.tomshardware.com/graphic/00q3/000717/radeon256–11.html.

"Occlusion Culling Algorithms," Gamasutra—Features—"Occlusion Culling Algorithms" [11.09.99], 6 pages, http://www.gamasutra.com/features/19991109/moller_haines_02.htm.

"Section 2—Cameras," 6 pages, http://www.dgp.toronto.edu/~jrmeredi/RenderDude/Docs/Cameras.html.

"Hierarchical Z–Buffer Visibility," 6 pages, http://www.people.fas.harvard.edu/~atchang/cs276/cs276r.html.

"Dynamic Scene Occlusion Culling," Trans. VCG: Abstract: Dynamic Scene Occlusion Culling, 1 page, http://www.computer.org/tvcg/tg1999/v0013abs.htm.

Baxter III, Department of Computer Science, UNC, "Occlusion Culling for Walkthroughs of Large Virtual Environments," May 8, 2000 7 pages, http://www.cs.unc.edu/~baxter/projects/occlusion.html.

"How Can You Incorporate This Functionality Into Your Application – Graphics Toolkits," Realistic Visualization of Design Data, 3D Graphics, shading, lighting, reflection, toolkits, etc. 4 pages,http://www.cswl.com/whiteppr/white/visualization.html.

"Primitives and Commands", 1 page, http://msdn.microsoft.com/library/psdk/opengl/int01_1ur7.htm.

"Basic OpenGL Operation," 1 page, http://msdn.microsoft.com/library/psdk/opengl/int01_02su.htm.

"OpenGL Graphic Control," 1 page, http://msdn.microsoft.com/library/psdk/opengl/int01_3jxo.htm.

"Execution Model," 1 page, http://msdn.microsoft.com/library/psdk/opengl/int0_3qcs.htm.

"OpenGL Reference," 1 page, http://msdn.microsoft.com/library/psdk/opengl/apxb4_82lh.htm.

"State Variables," 1 page, http://msdn.microsoft.com/library/psdk/opengl/apxb4_2w4z.htm.

"GL Functions," 7 pages, http://msdn.microsoft.com/library/psdk/opengl/glfunc01_4f03.htm.

"GLU Functions," 3 pages, http://msdn.microsoft.com/library/psdk/opengl/glufnc01_0e43.htm.

"Overview of OpenGL®," 9 pages, http://www.cs.wpi.edu/~ matt/courses/cs563/talks/OpenGL_Presentation/OpenGL_Presentation.

"2.1 The OpenGL API," 2 pages, http://www.compapp.dcu.ie/Projects/1999/dquinl.ca4/spec.html.

"SGI—Open GL Technical Information," 9 pages, http://www.sgi.com/software/opengl/datasheet.html.

U.S. Provisional Pat. No. 60/188,052, Greene, filed Oct. 21, 2003.

* cited by examiner

SYSTEM, METHOD, AND APPARATUS FOR EARLY CULLING

RELATED APPLICATIONS

This application claims benefit of U.S. Provisional Patent Application No. 60/330,676, filed Oct. 29, 2001, entitled "SYSTEM, METHOD, AND APPARATUS FOR EARLY CULLING".

FIELD OF THE INVENTION

This invention relates to video graphics processing.

BACKGROUND INFORMATION

Graphics rendering is an important part of many representational and interactive applications for computers. In three-dimensional (or '3D') graphics rendering, an image of a 3D rendering space is presented on a display frame as if the space is being viewed through a two-dimensional display plane. As shown in FIG. 1, the display frame 10 is an array of individual picture elements (or 'pixels') 30. Each pixel represents a sample of the display plane at a specified location and has a color value that corresponds to the color of the rendering space as viewed through the display plane at that location. For consumer applications, typical sizes for a display frame include 640×480, 800×600, 1024×768, 1152×864, 1280×1024, and 1600×1200 pixels. Computer displays and other high-resolution display devices, such as high-definition televisions (HDTVs), projectors, printers, and the like, present the pixel array to a viewer. The pixels are closely spaced, and the viewer's visual system performs a filtering of the individual pixels to form a composite image. If an image is properly partitioned into pixels that are sufficiently close together, the viewer perceives the displayed array as a virtually continuous image.

In a surface rendering scheme, three-dimensional 'wire frame' models of objects in the rendering space are constructed using graphics primitives (e.g. triangles or other elemental polygons). Each primitive is defined by a set of vertices that have values relating to location (e.g. in an XYZ coordinate space), quality (e.g. color and/or texture), and/or lighting (e.g. direction of surface normal). As the positions of the vertices with respect to the display plane include the spatial dimension of depth, or distance from the viewer (also referred to as the Z-dimension), objects may be drawn in front of or behind one another in overlapping fashion.

Some or all of the rendering of the object models into pixels for display may be performed in software. Alternatively, the sets of vertices may be presented to rendering hardware, either directly by the software application or via an application programming interface (API) such as the Direct3D component of the DirectX API suite (Microsoft Corp., Redmond, Wash.) or the OpenGL API (Silicon Graphics, Inc., Mountain View, Calif.).

FIG. 2 shows a block diagram for a 3D video graphics architecture. Such an architecture may be implemented in a video graphics card for use in a personal computer. Alternatively, at least a portion of the architecture may be implemented on a chip package that is integrated into a computer mainboard.

Rasterizer 120 receives a set of graphics primitives for each of the objects to be rendered in a scene. In this example, rasterizer 120 receives each primitive as a triangle having vertices as described above. Rasterizer 120 may receive the primitives from a software application such as a game, simulator, or other imaging application. Alternatively, as shown in FIG. 3, rasterizer 120 may receive the primitives from a transform and lighting engine 110, which may perform coordinate transform and/or lighting operations on the primitives. Rasterizer 120 converts the primitives into fragments, each fragment being a bundle of values to update a particular pixel of display frame 10 as represented in a frame buffer 170. For example, a fragment may include a value for each of the components in the colorspace (e.g. RGB, HSV, YCbCr) and an opacity or 'alpha' value. The fragment values may also indicate a corresponding location in the rendering space as well as corresponding locations in one or more texture, lighting, or environment maps.

Rasterizer 120 forwards the fragments to a pixel pipeline 130, where their values may be modified by processing-intensive operations such as smoothing, blending, and dithering and/or access-intensive operations such as texture and bump mapping. The particular operations that pixel pipeline 130 performs on a fragment may depend upon the current configuration of the pipeline (e.g. as defined by the current values of a set of pipeline state variables).

Render backend 160, which receives the fragments from pixel pipeline 130, includes a fragment culler 150 and a pixel combiner 140. Fragment culler 150 discards fragments according to the results of one or more culling tests. For example, fragment culler 150 may perform an occlusion test (or 'Z-test') by comparing a Z value of the fragment to a value of Z buffer 180 that corresponds to the same pixel. If a fragment is not discarded by the fragment culler, the corresponding pixel in frame buffer 170 may be updated (e.g. blended or replaced) by pixel combiner 140 according to the fragment's color value. Other values of a surviving fragment may be used to update corresponding locations in other display buffers as well: for example, the fragment's z-value may be used to update a corresponding location of Z buffer 180. When all of the objects to be rendered have been rasterized and incorporated into the display buffers, the contents of frame buffer 170 are modulated onto a display signal (not shown).

In order to enhance the appearance of a generated image, the pipeline may be configured to perform several operations on a fragment. For example, the color and/or alpha values of a fragment may be altered with reference to one or more effect maps (e.g. texture, bump, and light maps). Such operations may be costly in terms of processor cycles and/or memory bandwidth. If the fragment culler subsequently determines that the fragment is occluded and discards it, the resources expended on that fragment in the pixel pipeline (e.g. in terms of processor cycles and/or memory bus usage) have been wasted. It is desirable to reduce such waste.

SUMMARY

A method of graphics processing according to one embodiment of the invention includes determining a non-depth conditional status and an occlusion status of a fragment. Determining a non-depth conditional status of a fragment includes determining whether incorporation of a value (e.g. a color value) of the fragment into the pixel is conditional on a non-depth criterion. For example, this task may include determining a current configuration of a pixel pipeline (e.g. determining a value of at least one state variable) or determining whether a non-depth fragment test (such as an alpha test) is enabled. Determining an occlusion status of the fragment may include comparing another value (e.g. a Z value) of the fragment to a value of an entry of a scratchpad, where the entry is mapped to the pixel. Determining a conditional status and determining an occlusion status may occur in either order, and methods according to further embodiments may also include comparing a value (e.g. a Z value) of the fragment to a representative Z value (e.g. corresponding to a location value of the fragment).

A graphics architecture according to an embodiment of the invention includes an early culler and a scratchpad. The scratchpad is configured and arranged to store a value of an entry mapped to a pixel. The early culler is configured and arranged to receive a fragment corresponding to the pixel, to compare a first value (e.g. a Z value) of the fragment to the value of the entry, and to determine whether incorporation of a second value (e.g. a color value) of the fragment into the pixel is conditional on a non-depth criterion. Architectures according to other embodiments of the invention may also include a pixel pipeline configured and arranged to receive the fragment from the early culler.

DETAILED DESCRIPTION

Depth information is important to the 3D rendering process, as an object that is entirely opaque will occlude those portions of other objects that lie behind it with respect to the viewpoint. Because values of occluded fragments will not be entered into the display buffers (or will be overwritten before display), effort expended in rendering these fragments may be wasted. In some cases, processing overhead and/or memory bus usage may be considerably reduced by avoiding operations associated with rendering occluded fragments.

In a 3D graphics architecture, it may be desirable to identify fragments that will be discarded and cull them before they reach the pixel pipeline. Specifically, it may be desirable to identify and cull fragments that will be occluded. However, it may not be feasible to determine at the pipeline entrance whether a fragment ultimately will be occluded. One reason for this uncertainty is that the survival of potentially occluding fragments that are currently being processed within the architecture may still be unknown.

In addition to a Z-test, a graphics architecture may perform one or more other tests to determine whether a fragment will be incorporated into a frame buffer or will be discarded. These tests may include a pixel ownership test, a scissor test, an alpha test, a stencil test, and/or a chroma-key test:

A pixel ownership test determines whether the current context owns (e.g. may modify) the pixel that corresponds to the fragment.

A scissor test determines whether the fragment lies within a specified portion of the display frame.

An alpha test determines whether an alpha value of the fragment has a specified relation to a reference alpha value.

A stencil test determines whether a value of a location of the stencil buffer that corresponds to the fragment has a specified relation to a reference value.

A chroma-key test determines whether a color value of the fragment has a specified relation to a reference value.

In order to configure and enable these tests, a graphics architecture may include a set of state variables whose values may be modified (e.g. via an associated API). For example, these values may include reference values for the tests as well as control values that toggle specified tests between enabled and disabled modes.

Depending on the outcome of such non-depth fragment tests, a fragment may survive to be incorporated into the corresponding pixel, or it may be discarded. Until such tests are completed, it is unknown whether this fragment may occlude others.

Figure 1:
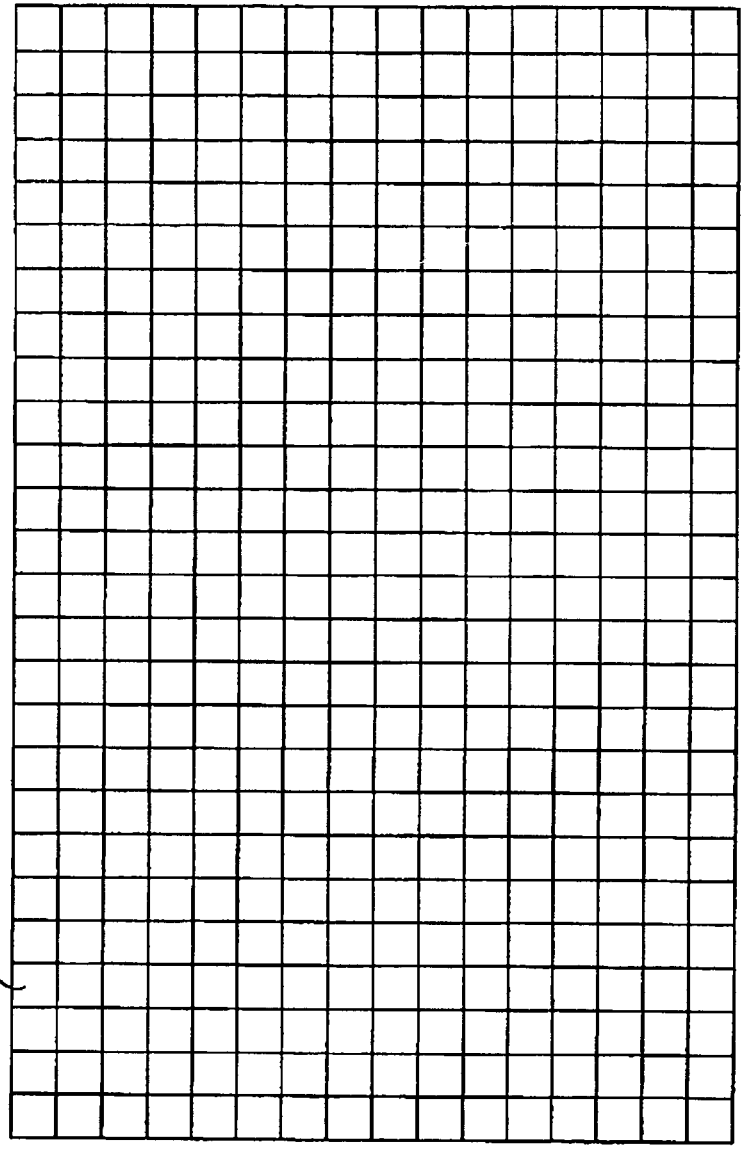
FIG. 1 shows a division of a display frame into pixels.
Figure 2:
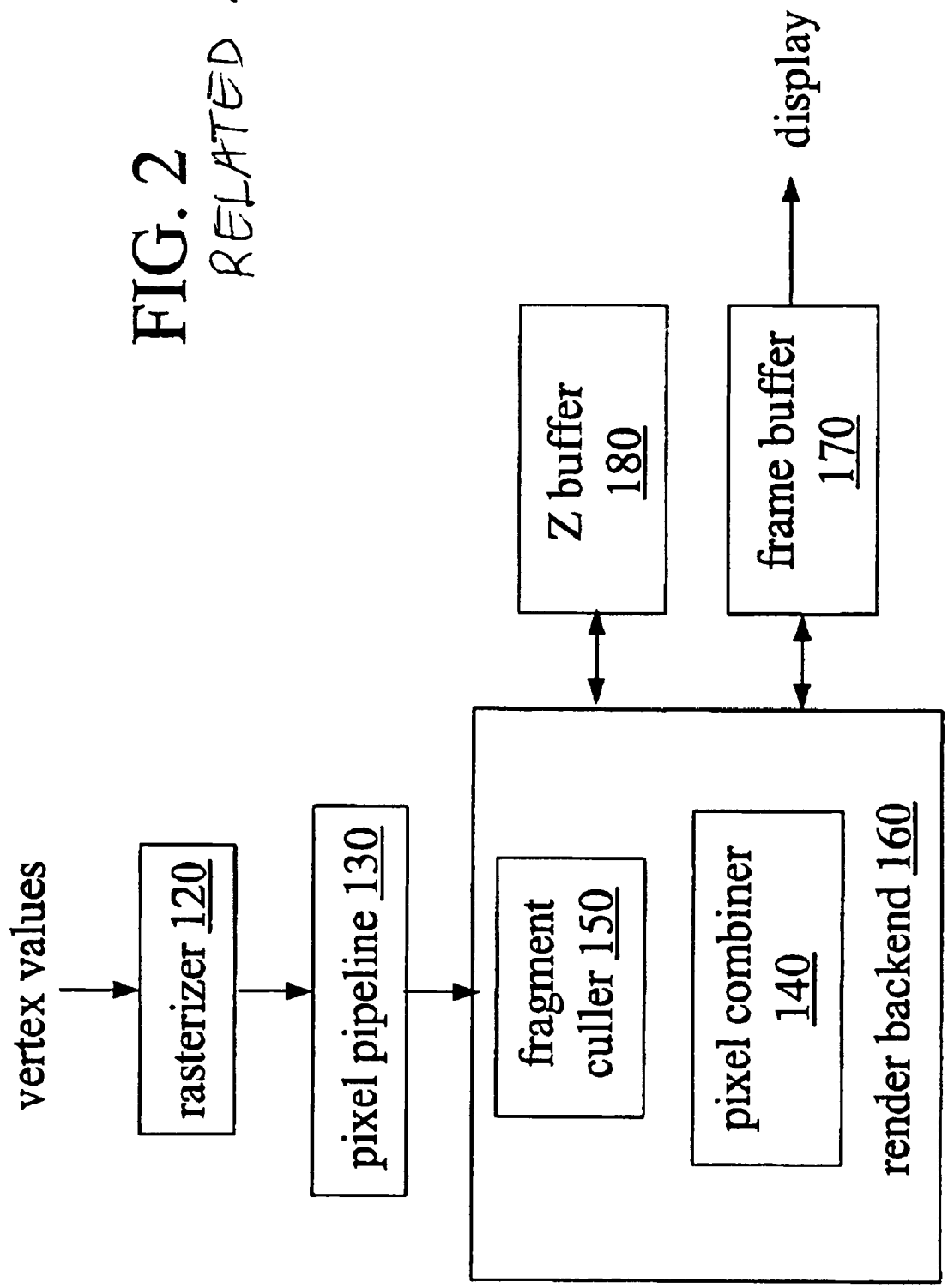
FIG. 2 shows a block diagram of a 3D graphics architecture.
Figure 3:
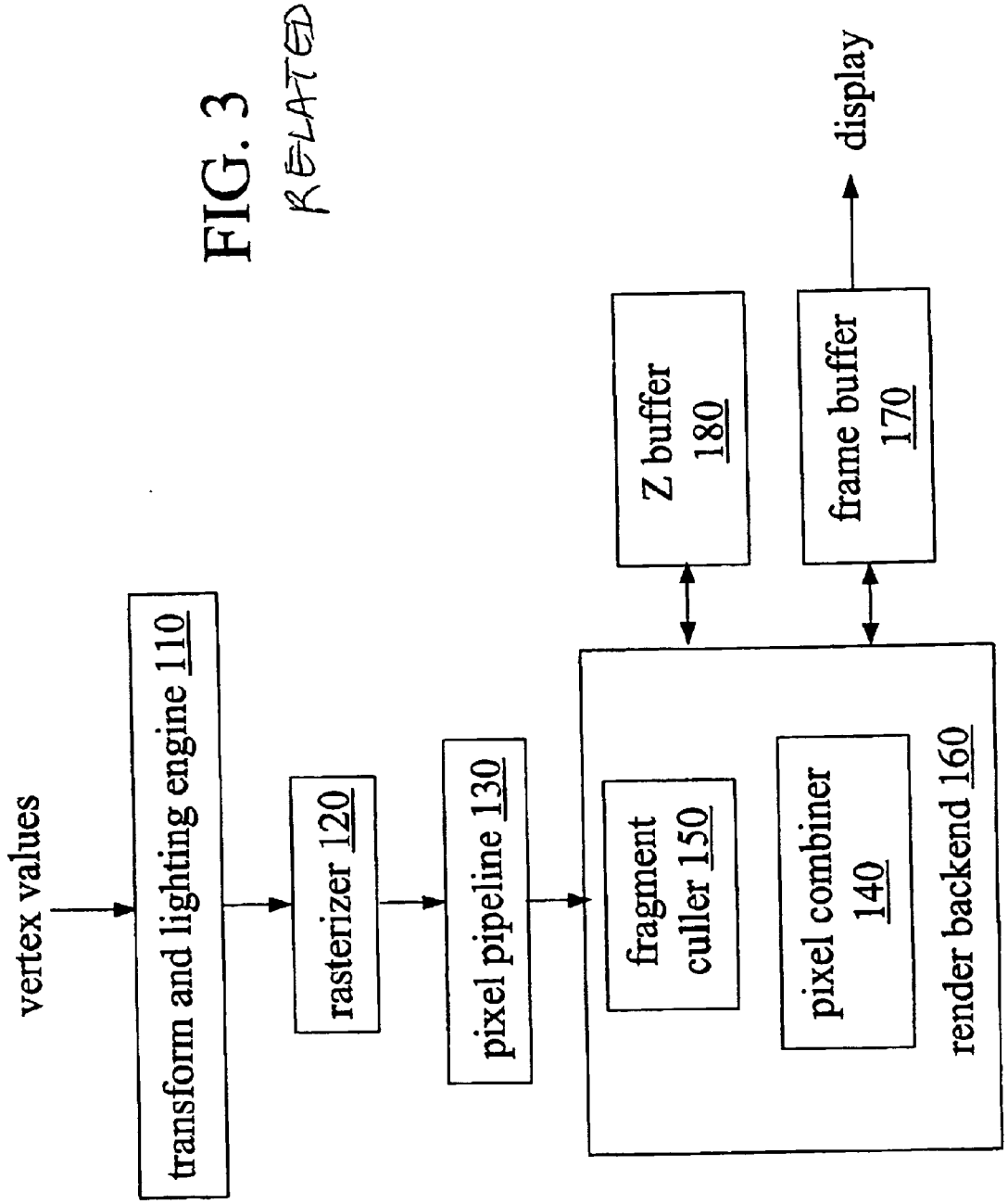
FIG. 3 shows a block diagram of another 3D graphics architecture.
Figure 4:
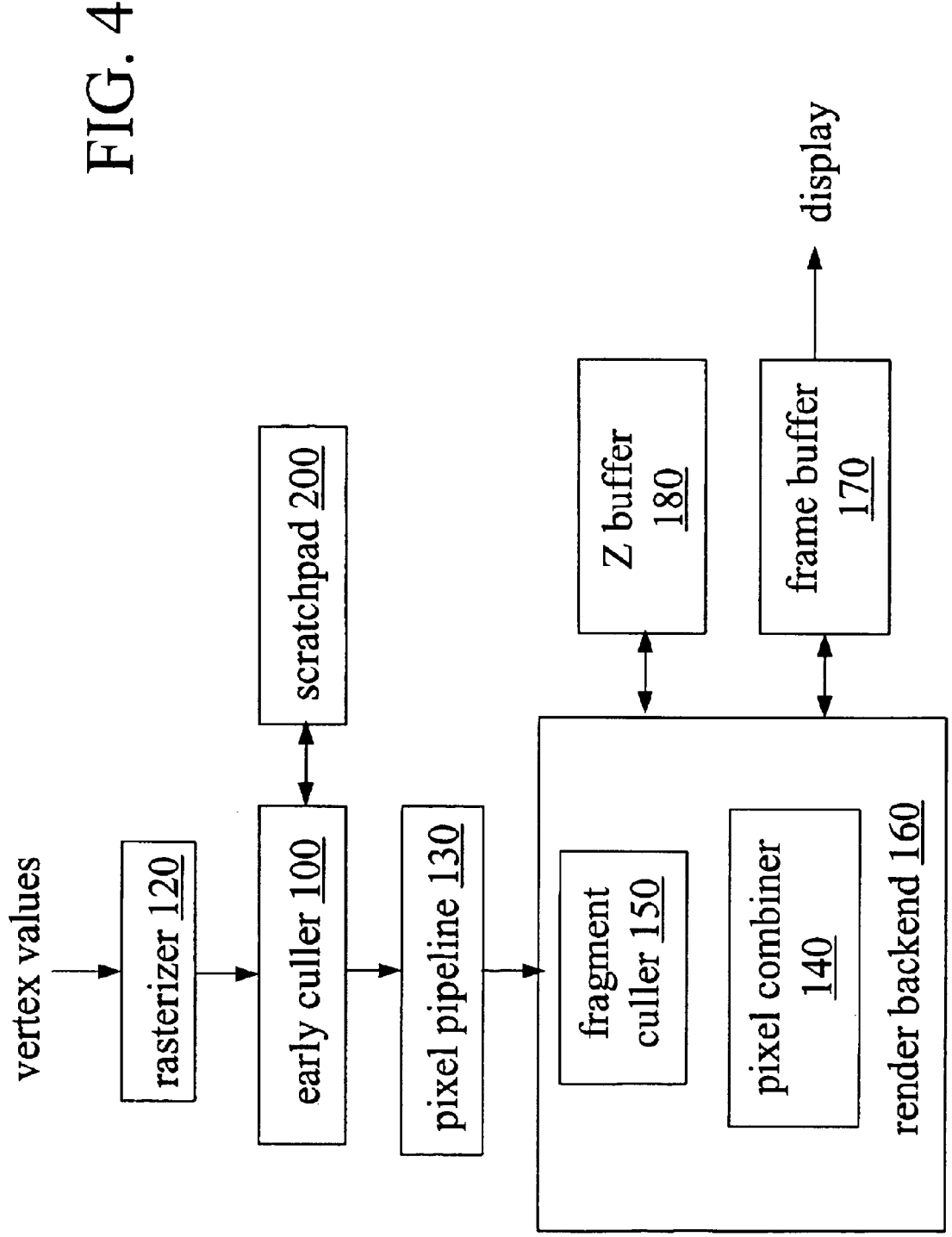
FIG. 4 shows a block diagram of a 3D graphics architecture according to an embodiment of the invention.

As shown in FIG. 4, a graphics architecture according to an embodiment of the invention includes an early culler 100 that compares Z values of fragments to Z values stored in a scratchpad 200. Fragments that fail the comparison (i.e. fragments identified as occluded) are culled. Fragments that pass the comparison are passed to the pixel pipeline, and their Z values may also be stored to the scratchpad. (As discussed herein, fragments that are far away from the viewpoint have higher Z values than fragments that are close, although other orientations of the Z-axis are also possible.) Early culler 100 also performs a task of determining a non-depth conditional status of a fragment as described herein.

Figure 5:
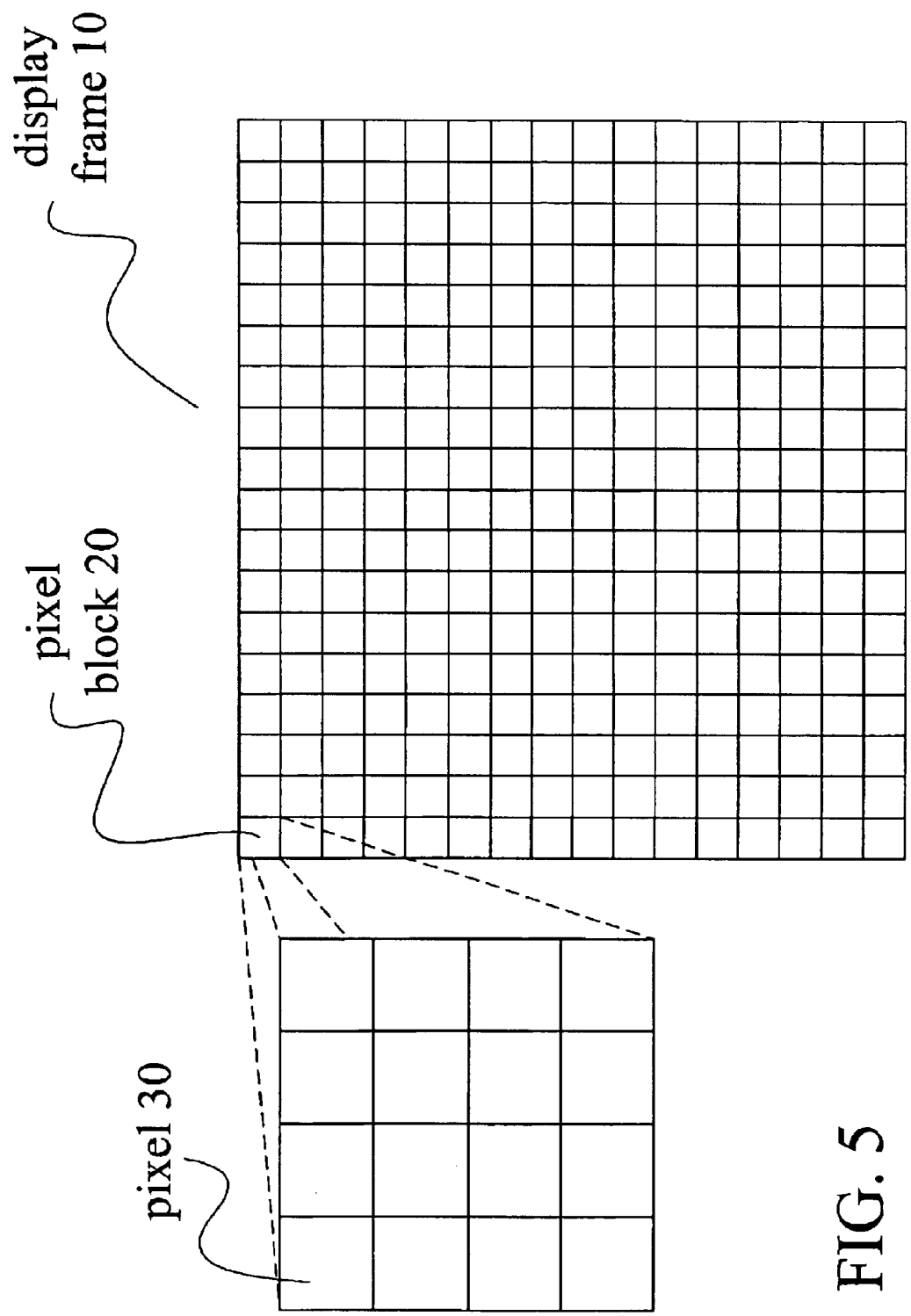
FIG. 5 shows a division of a display frame into pixel blocks.

FIG. 5 shows how display frame 10 may be divided into pixel blocks 20. Although FIG. 5 depicts pixel blocks 20 as square and of equal size, the division may be performed in any other manner that is efficient with respect to a particular application (e.g. in light of such factors as instruction set architecture, datapath width, and storage or tiling format). For example, blocks that are rectangular and/or interleaved may be used, or blocks of differing shapes and sizes may be distributed throughout a display frame. The same division scheme, or a different one, may be used for different rendering operations (e.g. for operations relating to color values as opposed to operations relating to Z values).

In an exemplary implementation, scratchpad 200 is organized into lines, each line being mapped to a predetermined region (e.g. a block) of display frame 10, and each entry in a line being mapped to a corresponding pixel within the predetermined region. As with a cache, the mapping of scratchpad 200 to display frame 10 may be direct-mapped, fully associative, or (n-way) set-associative. In this implementation, each entry of scratchpad 200 has a valid flag, and each line of scratchpad 200 also has a valid flag.

In a system that includes a stencil buffer, a portion of each Z value may be reserved for use in stenciling operations such as shadow processing. For example, eight bits of a 32-bit Z-value, or one bit of a 16-bit value, may be reserved for one or more stencil values. It may be desirable to omit the stencil portions when storing such fragment Z values to the entries of scratchpad 200.

Early culler 100 and scratchpad 200 may be implemented in a single chip package integrated on a computer mainboard. Early culler 100 and scratchpad 200 may also be implemented in a video graphics card for use in a personal computer. Alternatively, scratchpad 200 may reside at least in part in system memory. Although it is possible for early culler 100 to be implemented as a dedicated unit, or as one or more processes executing on a dedicated array of logic elements, it may be more efficient for early culler 100 to be implemented as one or more processes executing on an array that also performs some or all of the other processing tasks of a 3D graphics architecture (e.g. tasks of transform and lighting engine 110, rasterizer 120, and/or pixel pipeline 130).

Figure 6:
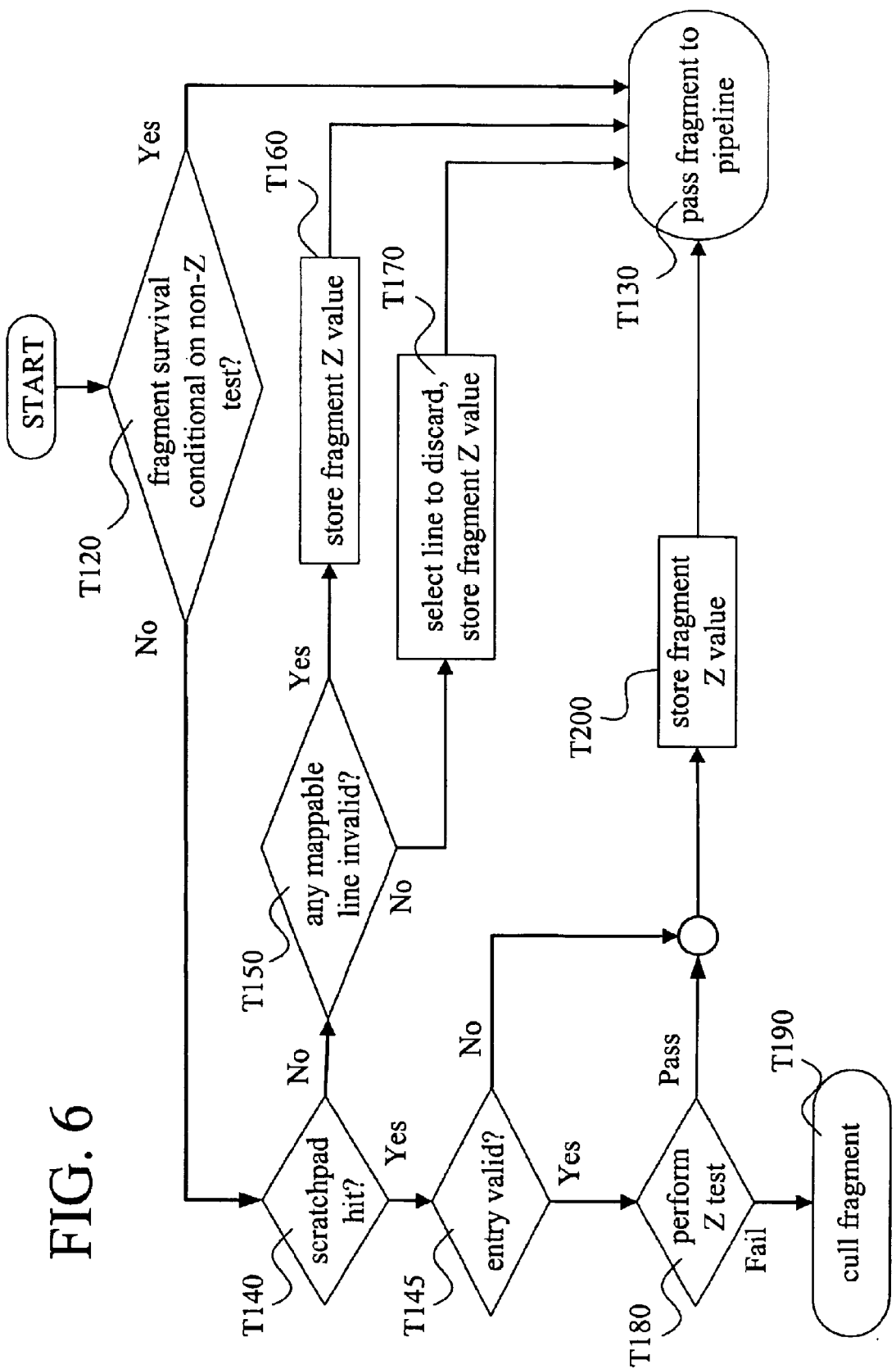
FIG. 6 shows a flow chart of a method according to an embodiment of the invention.

FIG. 6 shows a flow chart for a method according to an embodiment of the invention. Task T120 receives a fragment (e.g. from rasterizer 120) and determines a non-depth conditional status of the fragment. That is, task T120 determines whether incorporation of a value of the fragment (e.g. a color value) into the corresponding pixel is conditional on a criterion other than the fragment's Z value. For example, task T120 may determine that the pipeline is configured to perform an alpha test on the fragment, such that a failure of the test would prevent the fragment from being incorporated into the corresponding pixel. If incorporation of the fragment into the corresponding pixel is non-depth conditional, then task T130 passes the fragment to the pipeline and the method terminates.

In one implementation, task T120 simply determines whether any of a predetermined set of non-depth fragment tests are enabled. In an OpenGL application, for example, task T120 may call the function gl IsEnabled with arguments GL_ALPHA_TEST, GL_SCISSOR_TEST, and/or GL_STENCIL_TEST and test the results. In another implementation, task T120 also determines whether such a test as configured may actually cull any fragments. For example, while an alpha test may be enabled, it may also be configured to pass any fragment having an alpha value greater than or equal to zero. In such a case, although the test is enabled, it will not actually cull any fragments (assuming that the alpha values are constrained to be nonnegative).

Task T120 may also determine whether the pipeline is scheduled for a possible modification of a Z value of the fragment (e.g. as may occur in certain texture-based operations). In this case, if incorporation of the fragment into the corresponding pixel is non-depth conditional or if a modification of the fragment's Z value is possible, then task T130 passes the fragment to the pipeline and the method terminates.

If task T120 determines that the fragment is robust (i.e. not conditional on the result of a non-depth fragment test), then task T140 queries the scratchpad to determine whether any entry is currently mapped to a pixel that corresponds to the fragment's location value. If a scratchpad miss occurs (i.e. no entry is currently mapped to that location), task T150 determines whether any invalid scratchpad line may be mapped to a region (e.g. a block) that includes the pixel. If such a scratchpad line is found, task T160 maps the line accordingly, stores the Z value of the fragment to the appropriate entry, and marks the line and the entry as valid (the other entries of the line remain marked as invalid until fragment Z values are stored to them).

If task T150 fails to find an invalid scratchpad line that may be mapped to include the pixel, task T170 applies a predetermined replacement policy to select a scratchpad line for replacement. The selected scratchpad line is remapped, the fragment is stored to the appropriate entry, and the other entries of the line are invalidated. Task T130 passes the fragment to the pipeline and the method terminates.

Task T170 may include any appropriate cache replacement policy. For example, the replacement policy may be based at least in part on a least-recently-used (LRU) criterion. It may also be desirable for the replacement policy to account for the age of the scratchpad line. In a further implementation, the contents of the selected line are written to a miss cache or a victim cache, and task T140 checks the miss cache or victim cache before deciding that a scratchpad miss has occurred (for further discussion of miss caching and victim caching, see Norman P. Jouppi, "improving Direct-Mapped Cache Performance by the Addition of a Small Fully-Associative Cache and Prefetch Buffers," WRL Technical Note TN-14, Digital Equipment Corporation, Palo Alto, Calif., 1990). In an implementation where the scratchpad is direct-mapped, no selection of a scratchpad line is necessary in task T170.

If a scratchpad hit occurs in task T140, task T145 determines whether the corresponding entry is valid. If the entry is not valid, task T200 stores the Z value of the fragment to the entry and sets the valid flag. If the entry is valid, Z test task T180 compares its value to the Z value of the fragment. If the test succeeds (e.g. the Z value of the fragment is less than the value of the entry), then task T200 replaces the value of the entry with the Z value of the fragment (in this case, the valid flag is already set). The method passes the fragment to the pipeline and terminates in task T130. If the Z test of task T180 fails, the fragment is culled and the method terminates in task T190.

One technique for reducing Z-buffer traffic is to implement a representative Z value memory (also called a 'hierarchical Z buffer' or 'HRZ buffer') as described in copending U.S. patent applications Ser. No. 09/140,930, entitled "METHOD AND APPARATUS FOR PROCESSING OBJECT ELEMENTS THAT ARE BEING RENDERED," and Ser. No. 09/141,218, entitled "METHOD AND APPARATUS FOR EFFICIENT CLEARING OF MEMORY," both filed Aug. 27, 1998 and assigned to the assignee of the present application. This technique supports a conservative culling operation that uses less storage space and memory bandwidth than pixel-resolution Z buffering.

A hierarchical Z buffer that is updated only upon a Z cache miss may not contain the most current representative Z information. For example, changes that occur within a block may not be reflected in the HRZ buffer until the corresponding cache line is replaced. One effect of this latency is that a HRZ buffer test may pass fragments that a test using current representative Z information would have culled. For example, a HRZ buffer test may fail to cull fragments of a self-occluding object.

Figure 7:
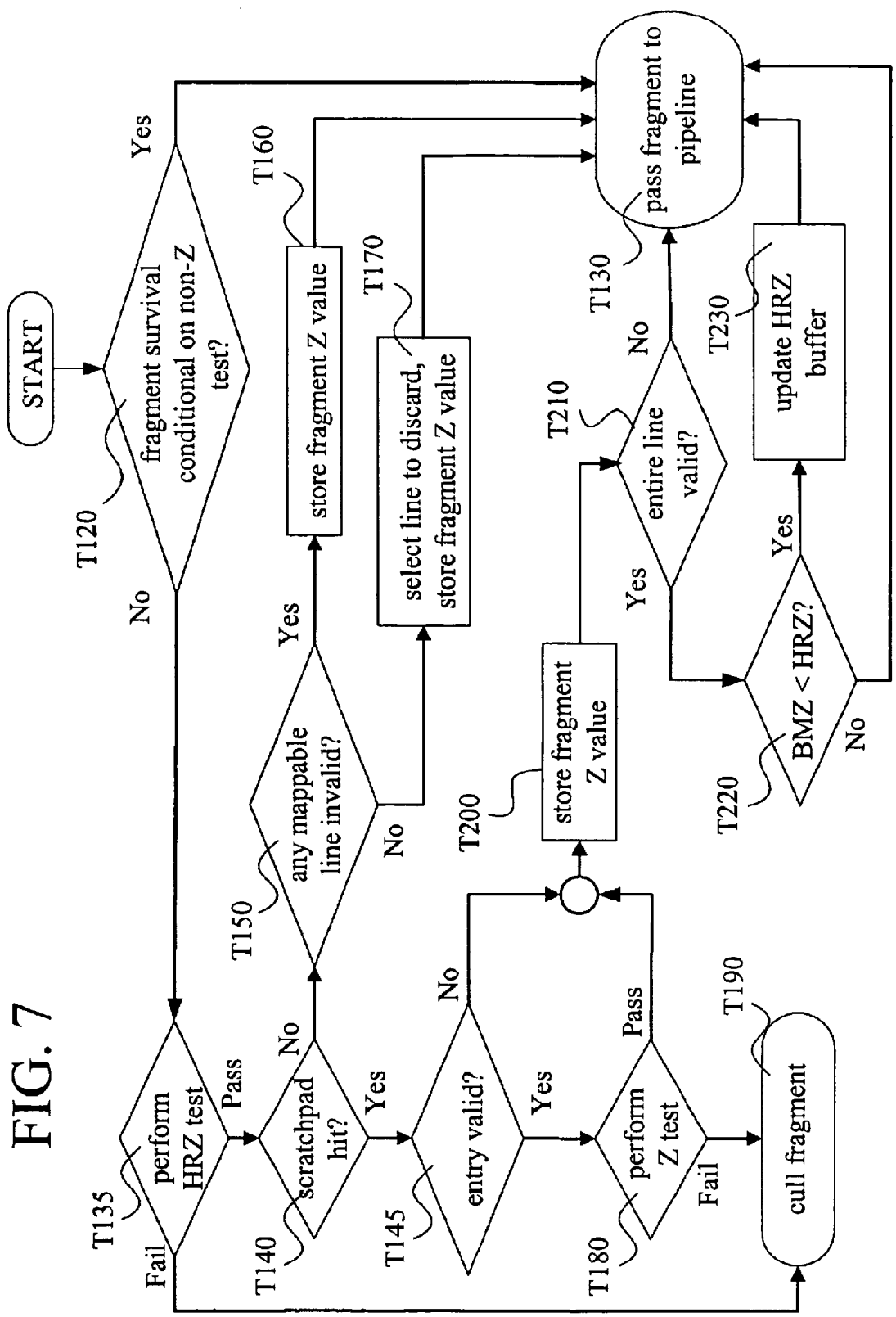
FIG. 7 shows a flow chart of a method according to another embodiment of the invention.

In contrast, changes that occur within a block may be reflected more quickly in a scratchpad as described herein, and a method using such a scratchpad may provide improved culling performance. FIG. 7 shows a flow chart of a method according to an embodiment of the invention that may be practiced in a system including a hierarchical Z buffer. In this method, task T135 compares the Z value of the robust fragment to the representative Z value that corresponds to the fragment's location value. If the test fails (i.e. the fragment is identified as occluded), the method terminates in task T190 and the fragment is culled. Otherwise, the method proceeds with task T140 as described above.

Although a method according to an embodiment of the invention may be practiced without such capability, a method as shown in FIG. 7 also includes updating the hierarchical Z buffer from valid scratchpad lines in tasks T210–T230 as described below. In this case, each line of scratchpad 200 corresponds to at least the same block of pixels as a representative Z value of the hierarchical Z buffer.

After the Z value of the fragment has been stored to the scratchpad line in task T200, task T210 determines whether all of the entries in the line are valid. If any entries are invalid, the method terminates in task T130 and the fragment is passed to the pipeline. Otherwise, task T220 identifies the backmost Z value ('BMZ value') among the entries of the line and compares it to the corresponding representative Z value. If the BMZ value is no closer to the display plane than the representative Z value, the method terminates in task T130 and the fragment is passed to the pipeline. Otherwise, task T230 updates the HRZ buffer by replacing the corresponding representative Z value with the BMZ value. In a further implementation, task T230 also marks the line as invalid (i.e. available for the storage of values of fragments corresponding to other blocks).

Figure 8:
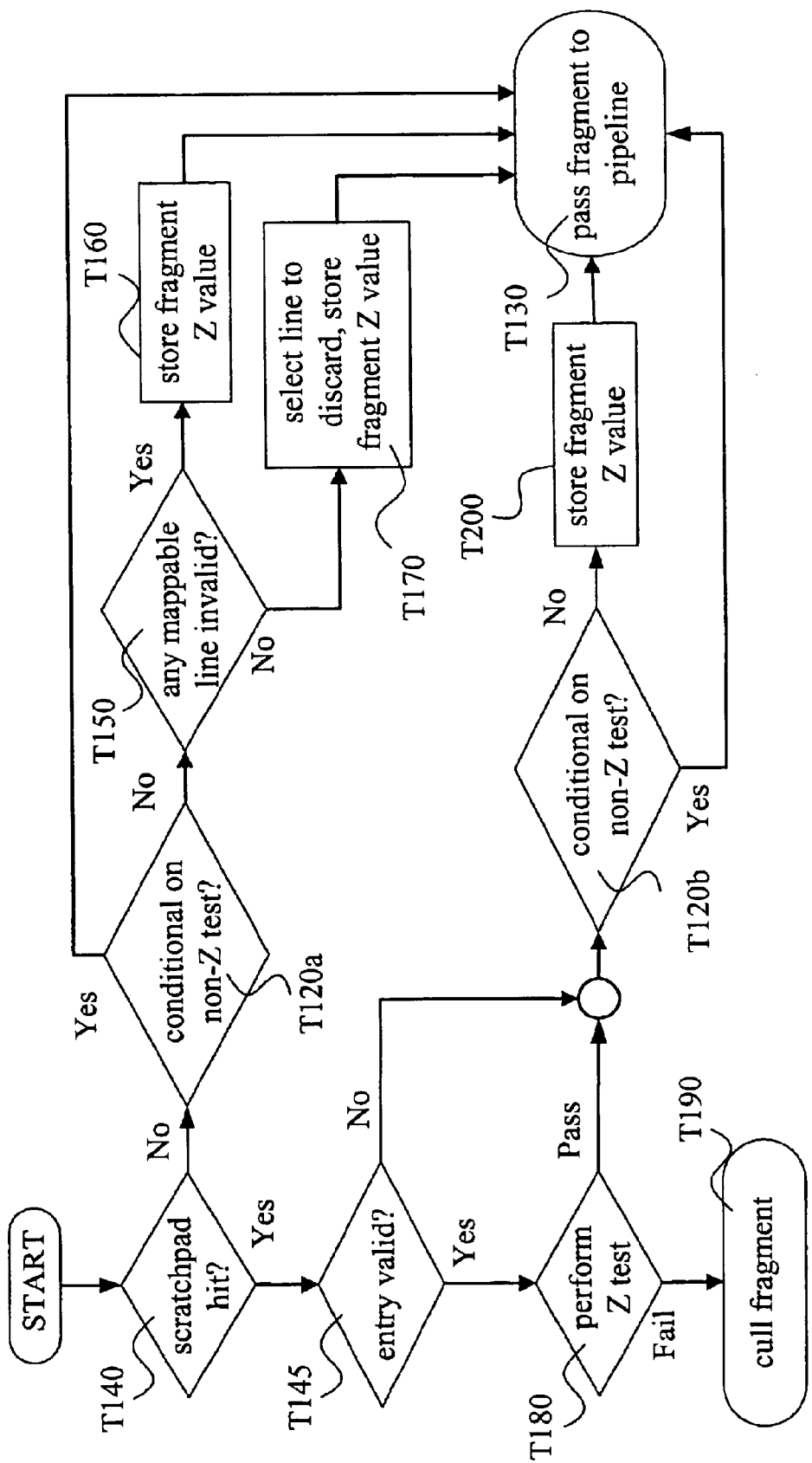
FIG. 8 shows a flow chart of a method according to a further embodiment of the invention.
Figure 9:
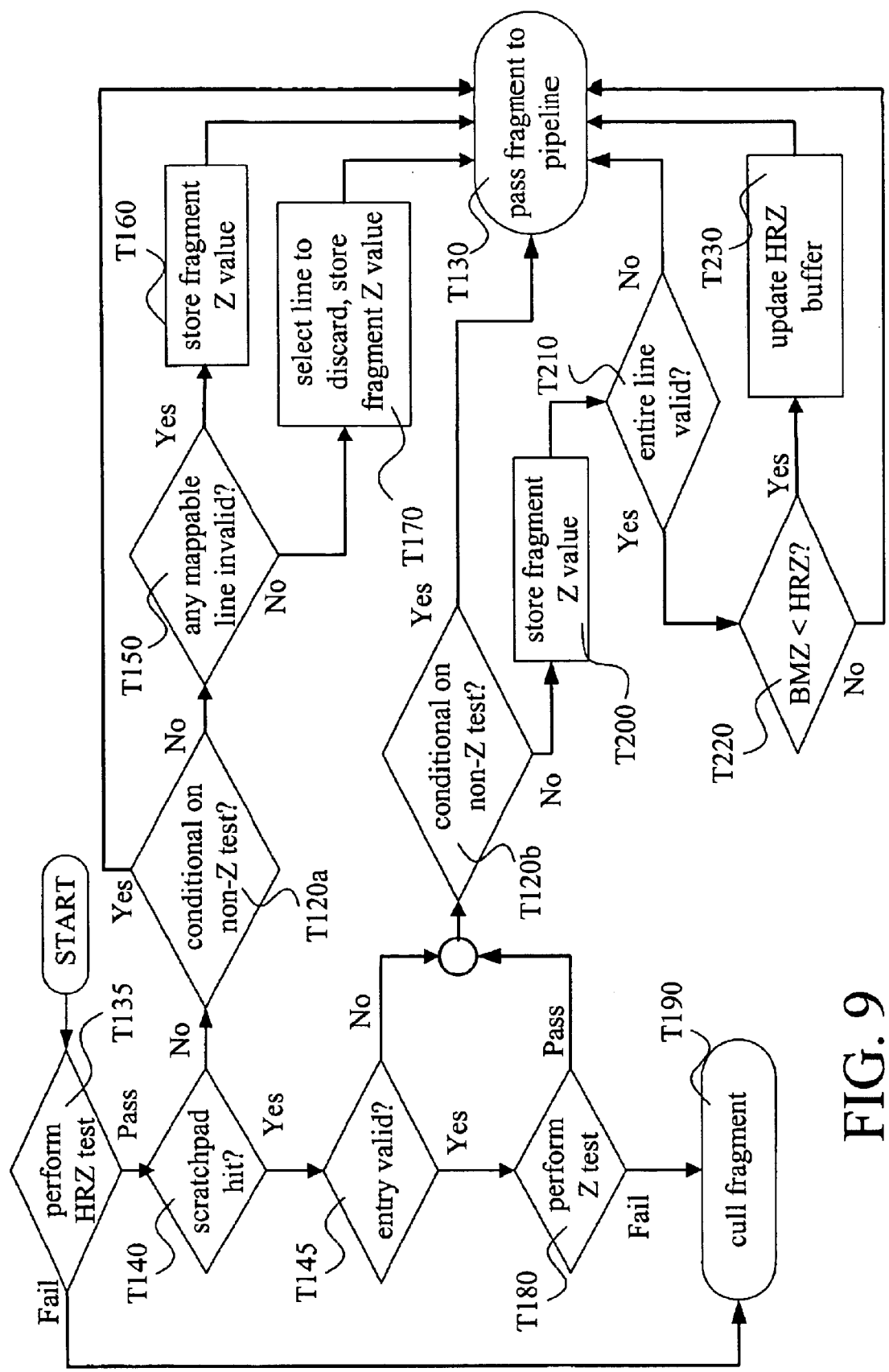
FIG. 9 shows a flow chart of a method according to a further embodiment of the invention.

FIGS. 8 and 9 show flowcharts of methods according to embodiments of the invention in which fragments may be tested for culling without regard to their conditional status, but only robust fragments are used to update the scratchpad. In these cases, conditional test tasks T120a,b are performed only when the contents of the scratchpad are about to be modified. This feature allows scratchpad-based culling of a fragment to be performed without any conditionality testing. FIG. 9 shows a flowchart of a method in which HRZ-based culling of a fragment may also be performed without any conditionality testing.

Figure 10:
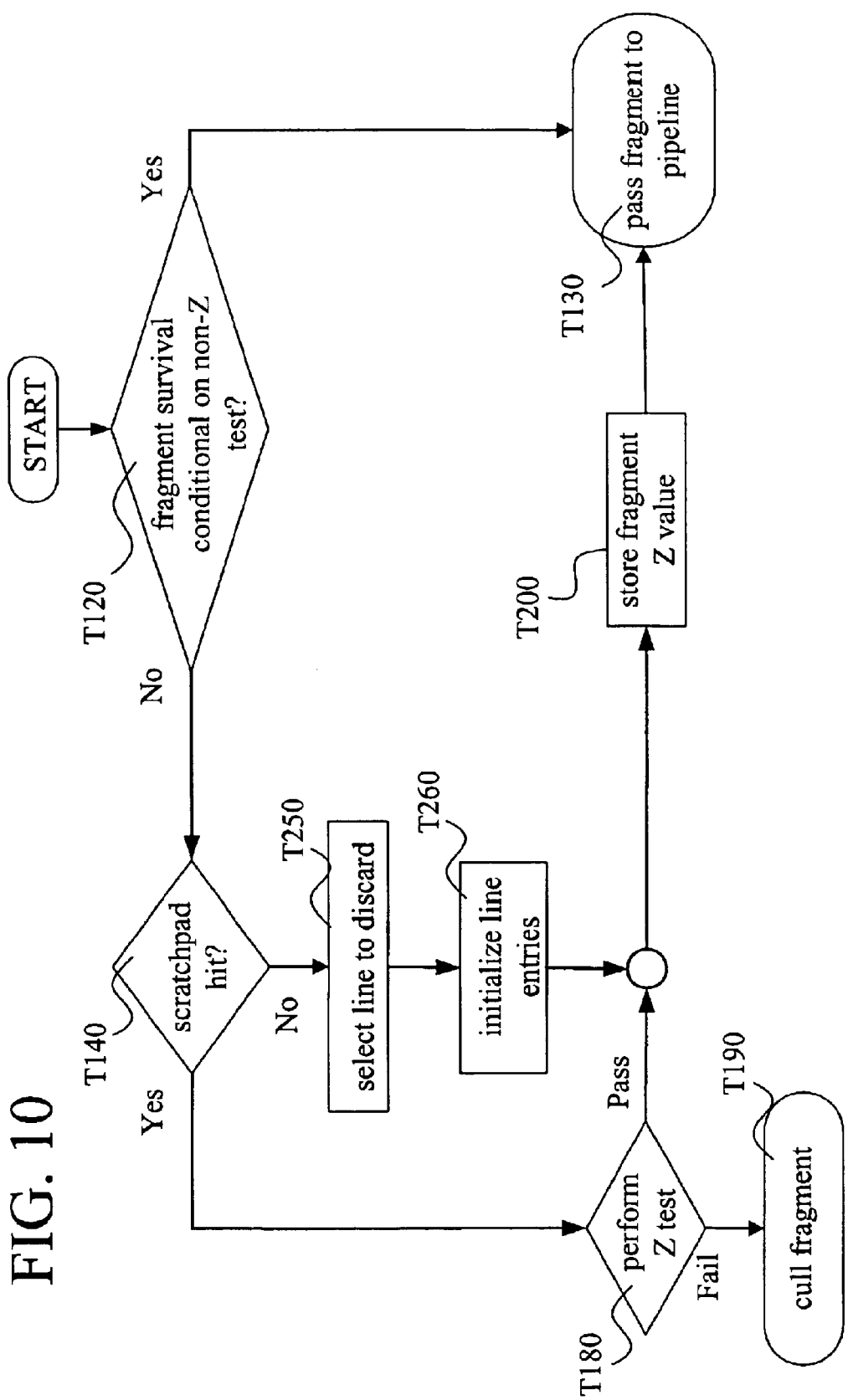
FIG. 10 shows a flow chart of a method according to a further embodiment of the invention.
Figure 11:
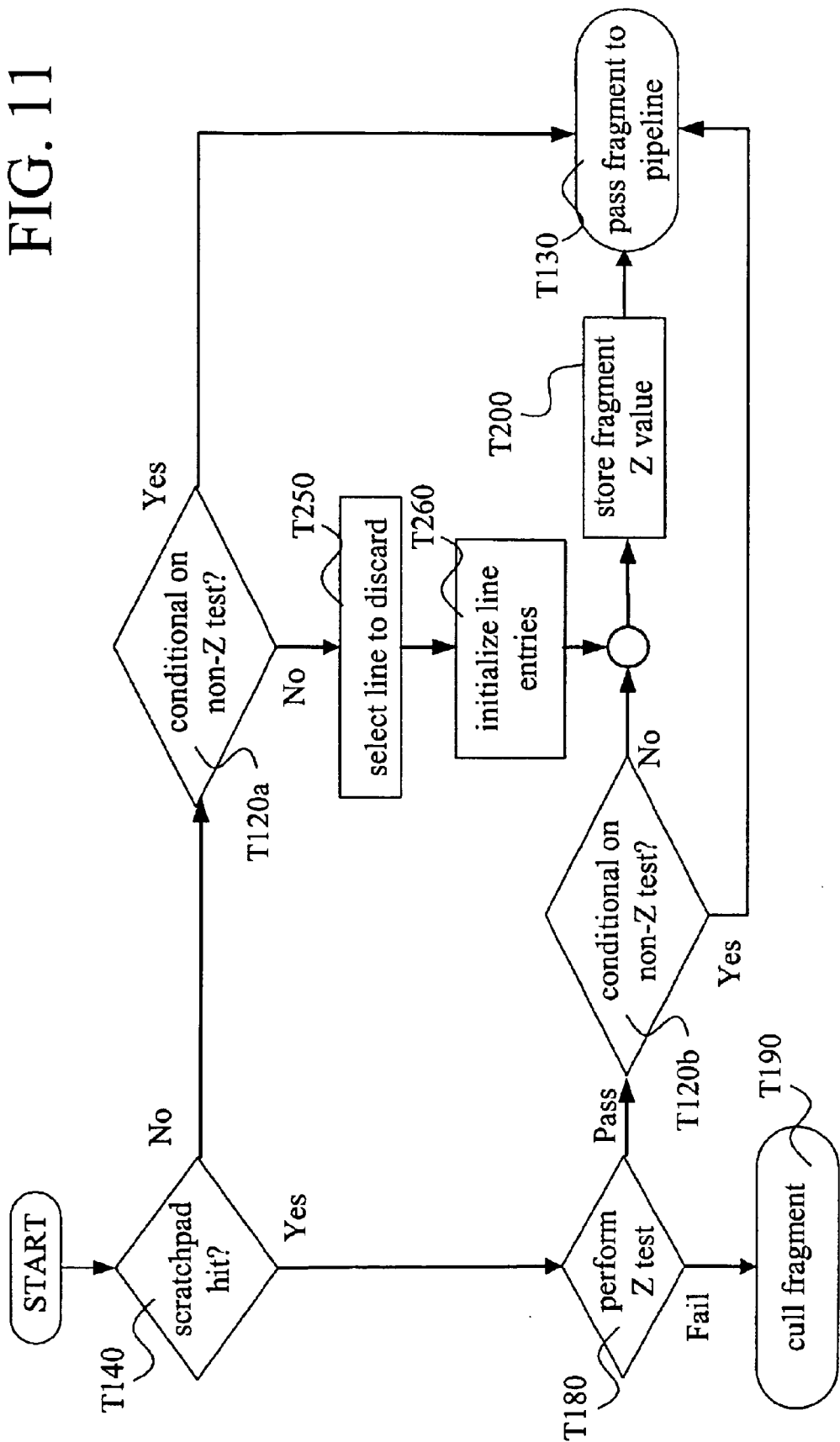
FIG. 11 shows a flow chart of a method according to a further embodiment of the invention.

FIGS. 10 and 11 show flowcharts of methods according to further embodiments of the invention wherein the entries of scratchpad 200 are initialized to a maximum Z value (i.e. in task T260). In other implementations, the entries of scratchpad 200 are initialized to the backmost Z value of the scene, of the Z buffer, or of the HRZ buffer. Alternatively, the entries of each line may be initialized to the representative Z value (from a hierarchical Z buffer) corresponding to that line. In such cases, the scratchpad may be implemented without using valid flags for entries. If the entire scratchpad is initialized, valid flags for lines may also be omitted. FIG. 11 shows a flowchart according to a further implementation in which fragments may be tested for culling without regard to their conditional status.

Figure 12:
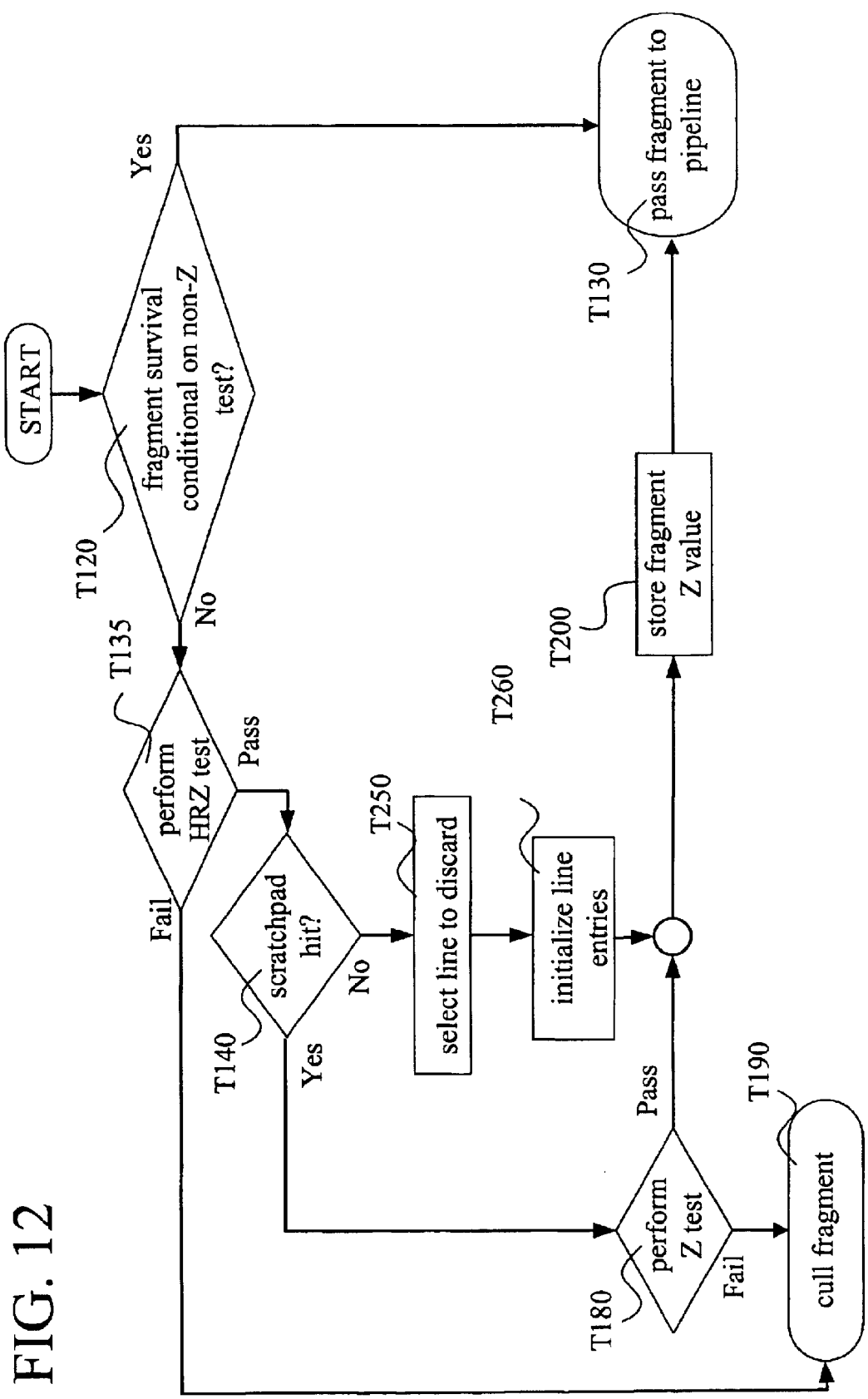
FIG. 12 shows a flow chart of a method according to a further embodiment of the invention.
Figure 13:
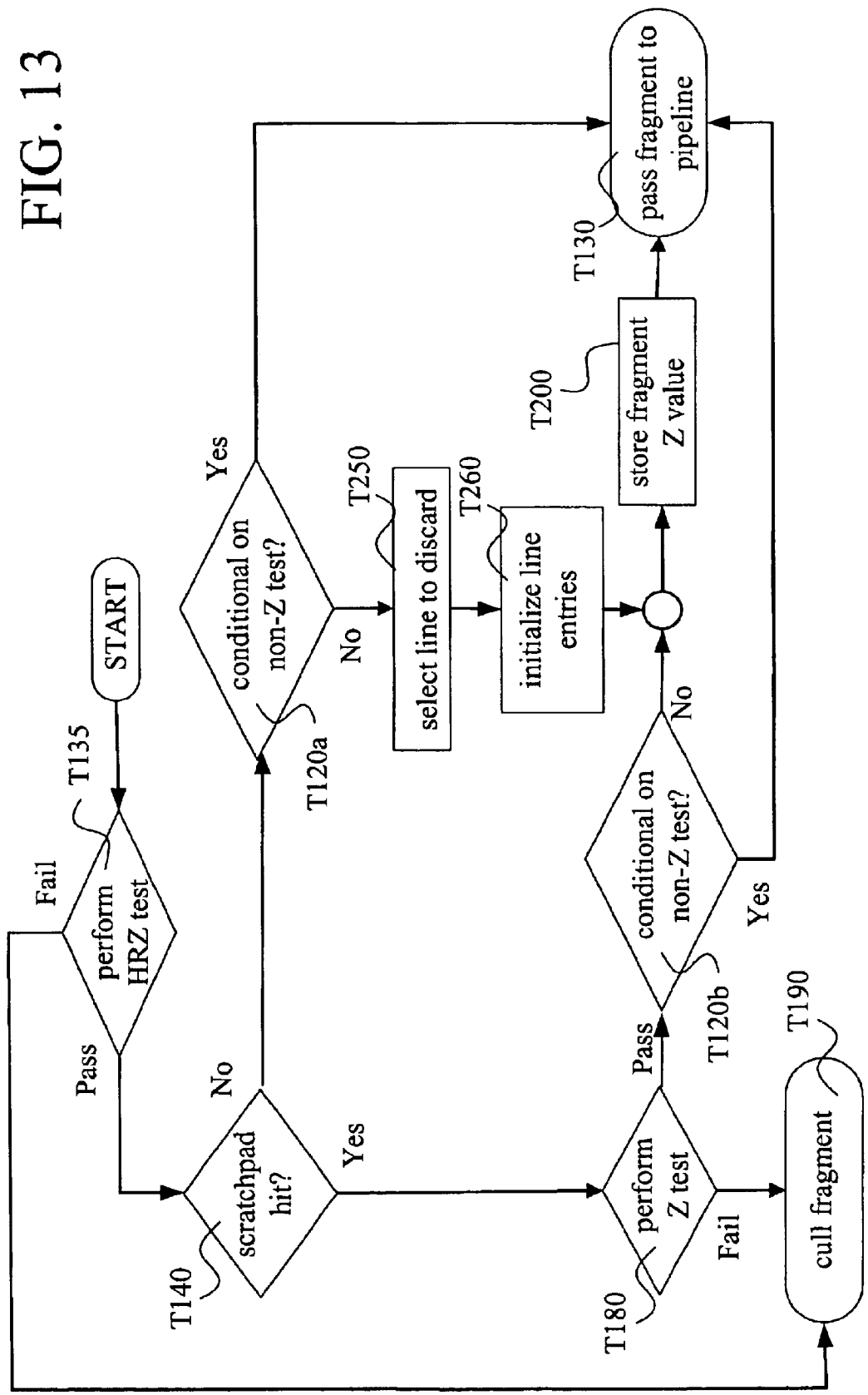
FIG. 13 shows a flow chart of a method according to a further embodiment of the invention.

In methods according to additional embodiments of the invention, tasks of scratchpad querying (as in task T140), conditional status testing (as in task T120), and HRZ buffer testing (as in task T135) may be performed in various sequences (e.g. according to efficiencies calculated or estimated with respect to the particular application or architecture) and with or without scratchpad entry initialization. FIGS. 12 and 13 show flowcharts of methods according to further embodiments of the invention that include HRZ buffer testing and wherein the entries of scratchpad 200 are initialized to a maximum Z value (or to another initial value as described above). A method as shown in FIG. 13 also includes the feature (e.g. as discussed above with reference to FIGS. 8 and 9) wherein fragments may be tested for culling without regard to their conditional status.

The foregoing presentation of the described embodiments is provided to enable any person skilled in the art to make or use the present invention. Various modifications to these embodiments are possible, and the generic principles presented herein may be applied to other embodiments as well. For example, an embodiment of the invention may be implemented in part or in whole as a hard-wired circuit or as a circuit configuration fabricated into a video graphics integrated circuit or field-programmable gate array. Likewise, an embodiment of the invention may be implemented in part or in whole as a firmware program loaded or fabricated into non-volatile storage (such as read-only memory or flash memory) as machine-readable code, such code being instructions executable by an array of logic elements such as a microprocessor or other digital signal processing unit. Further, an embodiment of the invention may be implemented in part or in whole as a software program loaded as machine-readable code from or into a data storage medium such as a magnetic, optical, magnetooptical, or phase-change disk or disk drive; a semiconductor memory; or a printed bar code.

Additionally, an embodiment of the invention may be applied to the early culling of fragments on non-depth bases as well: for example, according to opacity, color, or window or stencil membership. Thus, the present invention is not intended to be limited to the embodiments shown above but rather is to be accorded the widest scope consistent with the principles and novel features disclosed in any fashion herein.

What is claimed is:

1. A method of graphics processing, said method comprising:

determining a non-depth conditional status of a fragment corresponding to a pixel;

determining that a scratchpad contains an entry mapped to the pixel, comparing a Z value of the fragment to a value of the entry; and based on a result of said comparing, passing the fragment to a pixel pipeline, wherein determining a non-depth conditional status of a fragment includes determining whether incorporation of a second value of the fragment into the pixel is conditional on a non-depth criterion.

2. The method of graphics processing according to claim 1, said method comprising replacing a line of entries of the scratchpad according to a predetermined cache replacement policy.

3. The method of graphics processing according to claim 1, wherein the second value of the fragment includes a color value.

4. The method of graphics processing according to claim 1, wherein determining a non-depth conditional status of a fragment includes determining a current configuration of a pixel pipeline.

5. The method of graphics processing according to claim 4, wherein determining a current configuration of a pixel pipeline includes determining a value of at least one state variable.

6. The method of graphics processing according to claim 1, wherein determining a non-depth conditional status of a fragment includes determining whether a non-depth fragment test is enabled.

7. The method of graphics processing according to claim 1, wherein determining a non-depth conditional status of a fragment includes determining whether an alpha test is enabled.

8. The method of graphics processing according to claim 1, wherein said determining a non-depth conditional status of a fragment occurs before said comparing a Z value of the fragment to a value of the entry.

9. The method of graphics processing according to claim 1, wherein said determining a non-depth conditional status of a fragment occurs after said comparing a Z value of the fragment to a value of the entry.

10. The method of graphics processing according to claim 1, wherein comparing a Z value of the fragment to a value of the entry includes determining whether a Z value of the fragment is less than the value of the entry.

11. The method of graphics processing according to claim 1, further comprising overwriting the value of the entry with the Z value of the fragment.

12. The method of graphics processing according to claim 1, wherein said determining that a scratchpad contains an entry mapped to the pixel comprises querying the scratchpad with a location value of the fragment.

13. The method of graphics processing according to claim 1, wherein determining that a scratchpad contains an entry mapped to the pixel includes determining that the entry is valid.

14. The method of graphics processing according to claim 1, wherein determining that a scratchpad contains an entry mapped to the pixel includes determining that the scratchpad contains a line of entries, the line being mapped to a block of pixels that includes the pixel.

15. The method of graphics processing according to claim 14, wherein determining that the scratchpad contains a line of entries includes determining that the line is valid.

16. The method of graphics processing according to claim 14, further comprising initializing a value of each among the line of entries to the backmost among a set of Z values.

17. The method of graphics processing according to claim 14, further comprising initializing a value of each among the line of entries to the backmost among a set of representative Z values.

18. The method of graphics processing according to claim 1, further comprising comparing the Z value of the fragment to a representative Z value corresponding to the fragment.

19. The method of graphics processing according to claim 18, further comprising overwriting the representative Z value.

20. The method of graphics processing according to claim 19, wherein determining that a scratchpad contains an entry mapped to the pixel includes determining that the scratchpad contains a line of entries, the line being mapped to a block of pixels that includes the pixel, and
wherein overwriting the representative Z value includes comparing the representative Z value with the backmost Z value of the line.

21. The method of graphics processing according to claim 20, wherein said comparing the Z value of the fragment to a representative Z value occurs before said determining a non-depth conditional status of a fragment.

22. The method of graphics processing according to claim 1, further comprising initializing the value of the entry to an initial value.

23. The method of graphics processing according to claim 22, wherein the initial value is a maximum Z value.

24. The method of graphics processing according to claim 22, wherein the initial value is the backmost among a set of Z values.

25. The method of graphics processing according to claim 22, wherein the initial value is the backmost among a set of representative Z values.

26. The method of graphics processing according to claim 22, wherein the initial value is a representative Z value corresponding to a location to which the entry is mapped.

27. A method of graphics processing, said method comprising:
determining a non-depth conditional status of a fragment corresponding to a pixel;
determining whether a scratchpad contains an entry mapped to the pixel,
if the scratchpad contains an entry mapped to the pixel, comparing a Z value of the fragment to a value of the entry, and otherwise altering a portion of the scratchpad; and
based on a result of said comparing, passing the fragment to a pixel pipeline,
wherein determining a non-depth conditional status of a fragment includes determining whether incorporation of a second value of the fragment into the pixel is conditional on a non-depth criterion.

28. The method of graphics processing according to claim 27, wherein the second value of the fragment includes a color value.

29. The method of graphics processing according to claim 27, wherein determining a non-depth conditional status of a fragment includes determining whether a non-depth fragment test is enabled.

30. The method of graphics processing according to claim 27, wherein comparing a Z value of the fragment to a value of the entry includes determining whether a Z value of the fragment is less than the value of the entry.

31. The method of graphics processing according to claim 27, further comprising initializing the value of the entry to the backmost among a set of Z values.

32. The method of graphics processing according to claim 27, further comprising initializing the value of the entry to the backmost among a set of representative Z values.

33. The method of graphics processing according to claim 27, wherein altering a portion of the scratchpad includes storing the Z value of the fragment to the entry.

34. The method of graphics processing according to claim 27, wherein altering a portion of the scratchpad includes mapping a line of the scratchpad to a block of pixels that includes the pixel.

35. The method of graphics processing according to claim 34, wherein altering a portion of the scratchpad includes initializing a value of each among the line of entries to the backmost among a set of Z values.

36. A method of graphics processing, said method comprising:
determining a non-depth conditional status of a fragment corresponding to a pixel;
determining that a scratchpad contains an entry mapped to the pixel;
based on a value of the entry, determining an occlusion status of the fragment; and
subsequent to said determining an occlusion status, altering a value of the fragment,
wherein determining a non-depth conditional status of a fragment includes determining whether incorporation of a color value of the fragment into the pixel is conditional on a non-depth criterion.

37. The method of graphics processing according to claim 36, wherein determining a non-depth conditional status of a fragment includes determining whether a non-depth fragment test is enabled.

38. A graphics architecture comprising:
a logic circuit configured and arranged to receive a fragment corresponding to a pixel;

a scratchpad; and a pixel pipeline, wherein the logic circuit is configured to determine that the scratchpad contains an entry mapped to the pixel, and wherein the logic circuit is configured to compare a Z value of the fragment to a value of the entry, and wherein the logic circuit is configured to pass the fragment to the pixel pipeline based on a result of the comparing, and wherein the logic circuit is configured to determine whether incorporation of a second value of the fragment into the pixel is conditional on a non-depth criterion.

39. The graphics architecture according to claim 38, wherein logic circuit is configured to determine whether incorporation of a color value of the fragment into the pixel is conditional on a non-depth criterion.

40. The graphics architecture according to claim 38, wherein logic circuit is configured to determine whether a non-depth fragment test is enabled.

41. The graphics architecture according to claim 38, wherein the logic circuit is configured to determine whether a Z value of the fragment is less than the value of the entry.

42. The graphics architecture according to claim 38, wherein the logic circuit is configured to initialize the value of the entry to the backmost among a set of Z values.

43. The graphics architecture according to claim 38, wherein the logic circuit is configured to initialize the value of the entry to the backmost among a set of representative Z values.

44. The graphics architecture according to claim 38, wherein the logic circuit is configured to query the scratchpad with a location value of the fragment.

* * * * *

UNITED STATES PATENT AND TRADEMARK OFFICE
CERTIFICATE OF CORRECTION

PATENT NO. : 6,999,076 B2
APPLICATION NO. : 10/076350
DATED : February 14, 2006
INVENTOR(S) : Stephen L. Morein It is certified that error appears in the above-identified patent and that said Letters Patent is hereby corrected as shown below:

Page 2, bottom of second column: change "filed Oct. 21, 2003." to --filed Mar. 9, 2000.--
Column 8, lines 30-31: change "the pixel," to --the pixel;--
Column 10, lines 5-6: change "the pixel," to --the pixel;--
Column 11, line 18: change "logic circuit" to --the logic circuit--
Column 12, line 2: change "wherein logic circuit" to --wherein the logic circuit--

Signed and Sealed this

Seventeenth Day of October, 2006

JON W. DUDAS
*Director of the United States Patent and Trademark Office*